(No Model.) 3 Sheets—Sheet 1.

A. HEINEMANN.
JAR COVER.

No. 551,120. Patented Dec. 10, 1895.

Witnesses:
E. K. Sturtevant
E. A. Scott

Inventor:
Albert Heinemann
by
Attorneys (No Model.) 3 Sheets—Sheet 2.

A. HEINEMANN.
JAR COVER.

No. 551,120. Patented Dec. 10, 1895.

Witness:
E. K. Sturtevant
E. A. Scott

Inventor:
Albert Heinemann
by Richards
Attorney (No Model.) 3 Sheets—Sheet 3.

A. HEINEMANN.
JAR COVER.

No. 551,120. Patented Dec. 10, 1895.

Witness:
E. K. Sturtevant
E. A. Scott

Inventor:
Albert Heinemann
by Renavarr
attorneys

UNITED STATES PATENT OFFICE.

ALBERT HEINEMANN, OF BERLIN, GERMANY.

JAR-COVER.

SPECIFICATION forming part of Letters Patent No. 551,120, dated December 10, 1895.

Application filed May 25, 1895. Serial No. 550,694. (No model.)

*To all whom it may concern:*

Be it known that I, ALBERT HEINEMANN, merchant, a subject of the Emperor of Germany, and a resident of Berlin, in the Empire of Germany, have invented a new and useful Improved Hermetically-Closing Jug or Pitcher, of which the following is a full, clear, and exact description.

This invention relates to a jug, pitcher, or like vessel of stoneware, porcelain, or the like, which vessel may be hermetically closed. It is therefore especially designed for beer or other beverages, which on account of their nature it is preferable to protect from the influences of air and light. In order to effect this, the vessel is made with a conically-shaped neck, in which fits a correspondingly-shaped lid provided with an easily-removable packing-ring. The lid is then held in the closed position by a suitable locking device. In cases where the handle and lid-supporter form parts of the attachment of the vessel the locking device is constructed so as not only to hermetically close the vessel, but at the same time to draw all the attachments securely together. The arrangement, however, is such that such attachments may be readily removed in case the vessel is broken, or when it is desired to thoroughly clean same.

Figure 1:
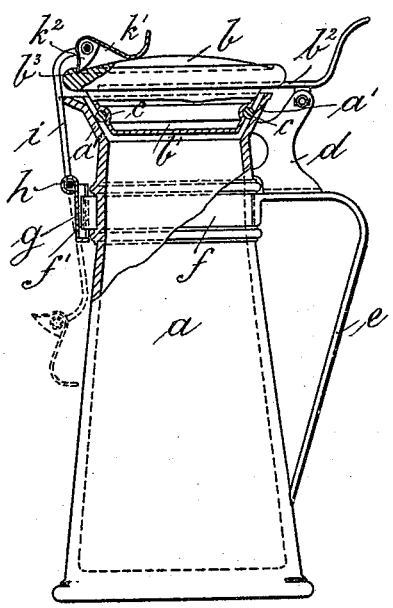
Figure 2:
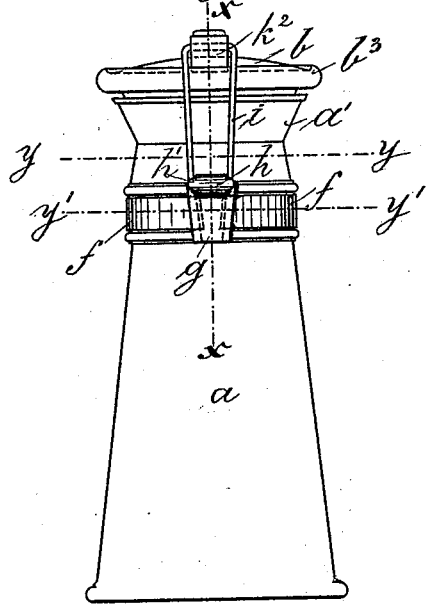
Figure 3:
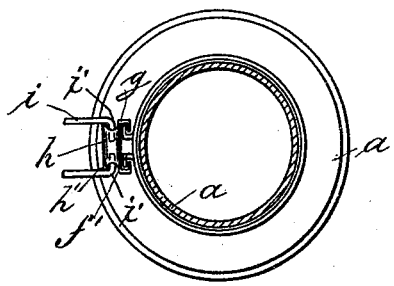
Figure 4:
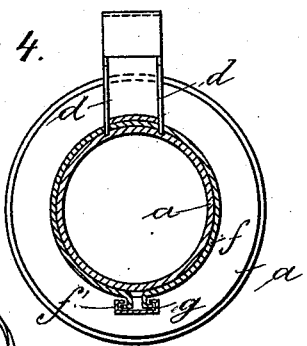
Figure 5:
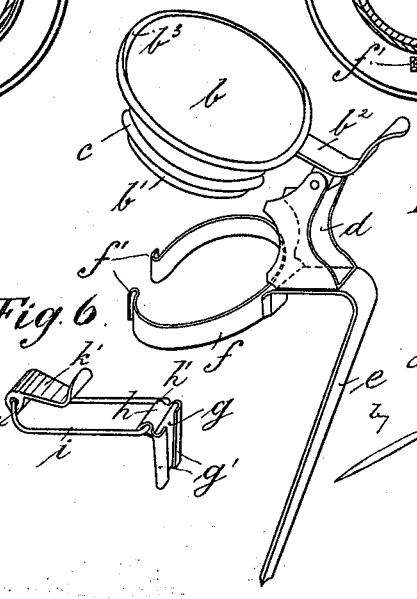
Figure 7:
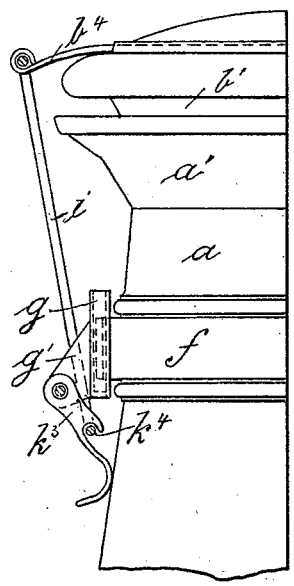
Figure 8:
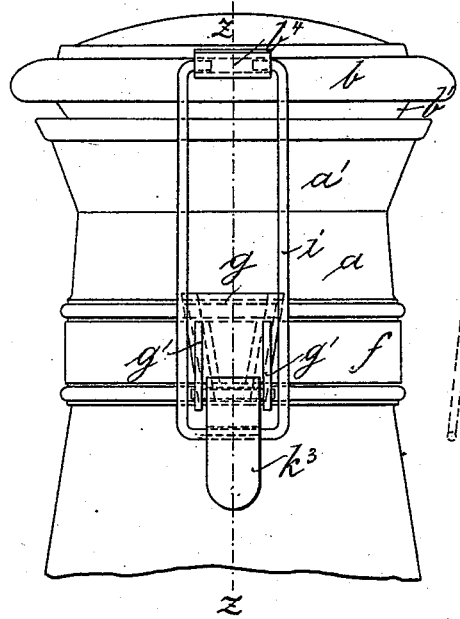
Figure 11:
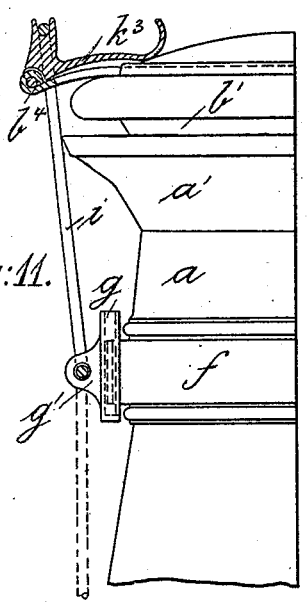
Figure 12:
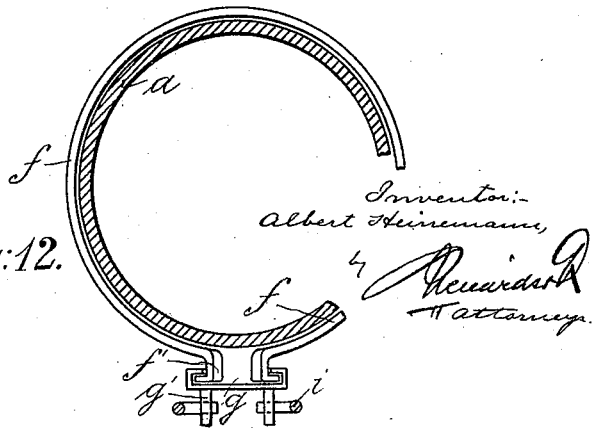
Figure 13:
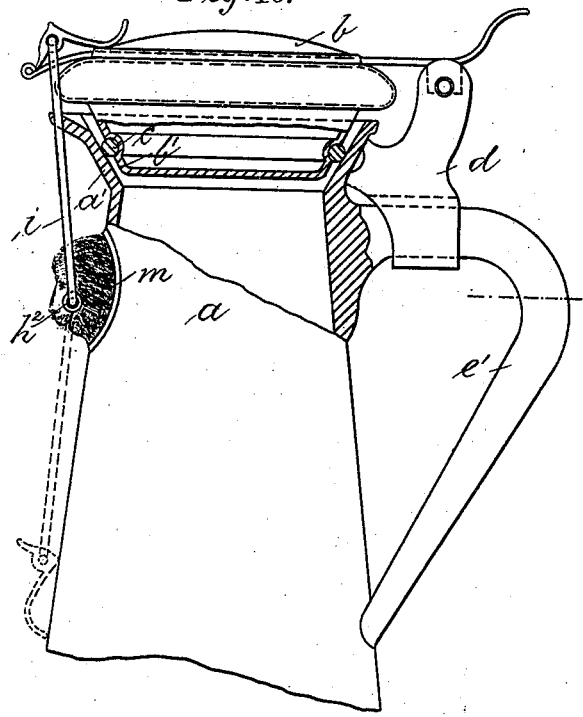
Figure 14:
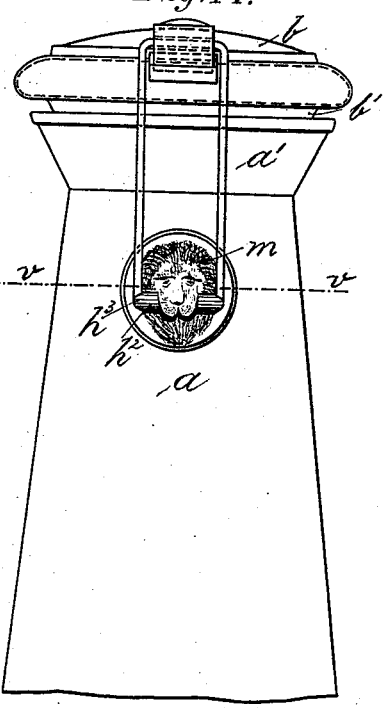
Figure 15:
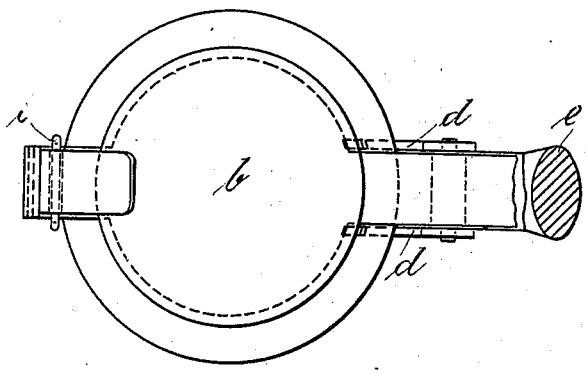
Figure 16:
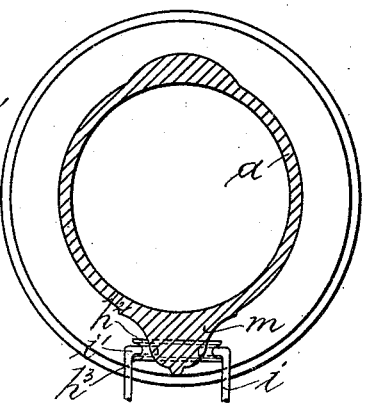

Referring to the accompanying drawings, Figure 1 is a side view, partly in section, of the vessel; and Fig. 2 a front view of same. Fig. 3 is a section on line $y\ y$ of Fig. 2 and showing the locking device in the open position. Fig. 4 is a horizontal section on line $y'\ y'$ of Fig. 2. Fig. 5 is a perspective view showing the attachments removed from the vessel, and Fig. 6 a like view of the locking device alone. Fig. 7 is a part side view of a vessel, the locking device being arranged on the securing-hoop; Fig. 8, a front view of same, and Fig. 9 a part vertical section on line $z\ z$ of Fig. 8; Fig. 10, a front view; Fig. 11, a side view, in part section, of a vessel having the locking device arranged on the lid. Fig. 12 is a horizontal section on line $w\ w$ of Fig. 10. Fig. 13 is a side view, partly in section, of a vessel, the handle of which is integral with same and the closing device secured in a projecting part of the vessel. Fig. 14 is a front view of Fig. 13. Fig. 15 is a plan of same, the handle being broken away. Fig. 16 is a horizontal section on line $v\ v$ of Fig. 14.

The vessel $a$ (shown in Figs. 1 to 6) is made of stoneware, porcelain, or like material, and has a conical neck $a'$, in which fits the correspondingly-shaped part $b'$ of the lid $b$. Said conical part $b'$ is provided with a groove for receiving a packing-ring $c$, so that when the lid is closed a hermetic closing of the vessel is effected. The lid $b$ is connected to the support $d$ by part $b^2$ in the usual manner, such support $d$ being in turn secured to or forming part of the handle $e$. A band or hoop $f$, of suitable elastic metal, is secured to the handle $e$; but at the front the vessel is open and its ends $f$, Fig. 5, bent over for receiving a wedge-like slide $g$, whose lateral edges $g'$ are also bent over, so as to engage with the ends $f'$ of the band $f$. On pushing the slide $g$ onto the band $f$, therefore, the latter is drawn tightly round the vessel and thus all the attachments secured.

Figure 6:
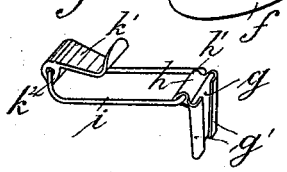

The upper end of slide $g$ is provided with a bent part or collar $h$, Fig. 6, for receiving the bent ends $i'$ of the closing-wire $i$. As will be seen, the ends of the collar $h$ are U-shaped, and thus on putting the wire $i$ into the open and closed positions the ends $i'$ of the latter are forced outward by the projecting rounded ends $h'$ of the collar $h$, which thus fulfills the functions of a spring. When the lid is open, therefore, the wire $i$ is held firmly against the side of the vessel, as shown by dotted lines in Fig. 1.

The end of the wire $i$ is provided with a locking-lever, the part $k'$ being suitably turned up to allow of same being readily opened, while the other end has a nose-like part $k^2$ for engaging with the flange $b^3$ of lid $b$, or with a projecting part of the latter. When, therefore, the nose $k^2$ of the locking-lever is forced over the flange $b^3$, the lid is held firmly over the mouth of the vessel and the attachment drawn tightly together by the slide $g$.

The lid $b$ is opened by turning back the part $k'$ of the locking-lever and the whole attachments removed from the vessel by simply pressing down the slide $g$, and thus releasing the ends of band $f$.

Figure 9:
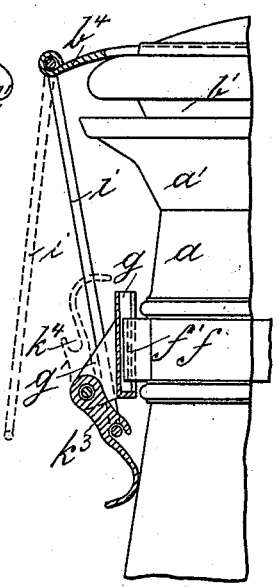
Figure 10:
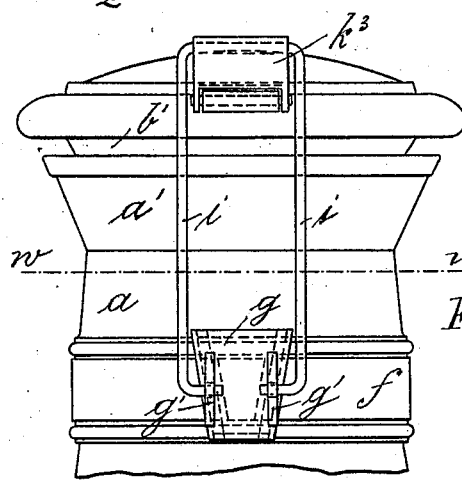

As shown in the modified forms, Figs. 7 to 9, the closing-wire $i$ is hinged to the lid extension $b^4$, while the locking-lever $k^3$ is held in the lugs $g'$ $g'$ of conical slide $g$. For this purpose the lever $k^3$ is provided with groove $k^4$ for receiving the closing-wire $i$.

Figs. 10, 11, and 12 show the arrangement reversed—i. e., the wire $i$ being arranged on the lugs $g'$ of slide $g$ and the locking-lever $k^3$ on the lid extension $b^4$.

Figs. 13 to 16 show the handle $e$ formed integral with the vessel, the metal band or hoop illustrated in the previous modifications being in this case preferably dispensed with. The locking device is then attached to a projecting part $m$ of the vessel, in which part $m$ a small tube $h^2$, provided with U-shaped ends $h^3$, is suitably secured for receiving the ends $i'$ of closing-wire $i$. The lid-supporter $d$ is fixed to the handle $e'$ in the usual manner.

Having now particularly described and ascertained the nature of this invention, I declare that what I claim, and wish to secure by Letters Patent, is—

1. A hermetically-closing jug or pitcher having conical neck and lid and provided with a locking device, consisting of a bent bar or wire ($h$) locking lever, wedge-shaped slide ($g$) securing the band or hoop ($f$) surrounding the vessel and locking all the parts when in the closed position, substantially as described and shown in the drawings.

2. In combination, the jug or pitcher having a pivoted stopper, the support for the same having a split spring clasp, and means adapted to fit and lock the free ends of said clasp and to also lock the said stopper in place, substantially as described.

In witness whereof I have hereunto signed my name in the presence of two subscribing witnesses.

ALBERT HEINEMANN.

Witnesses:
   F. KOLHN,
   WM. HAUPT.